Figure 6:
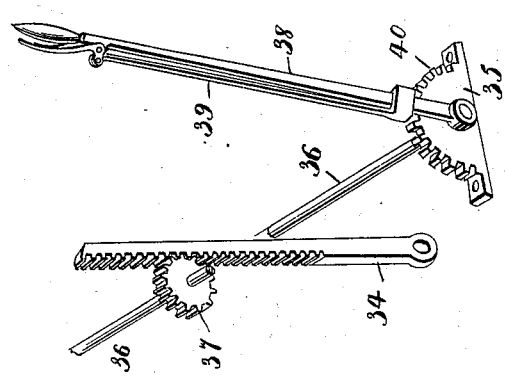

(No Model.) 3 Sheets—Sheet 1.
J. C. D'AZEVEDO.
CANE PLANTER.
No. 594,720. Patented Nov. 30, 1897.
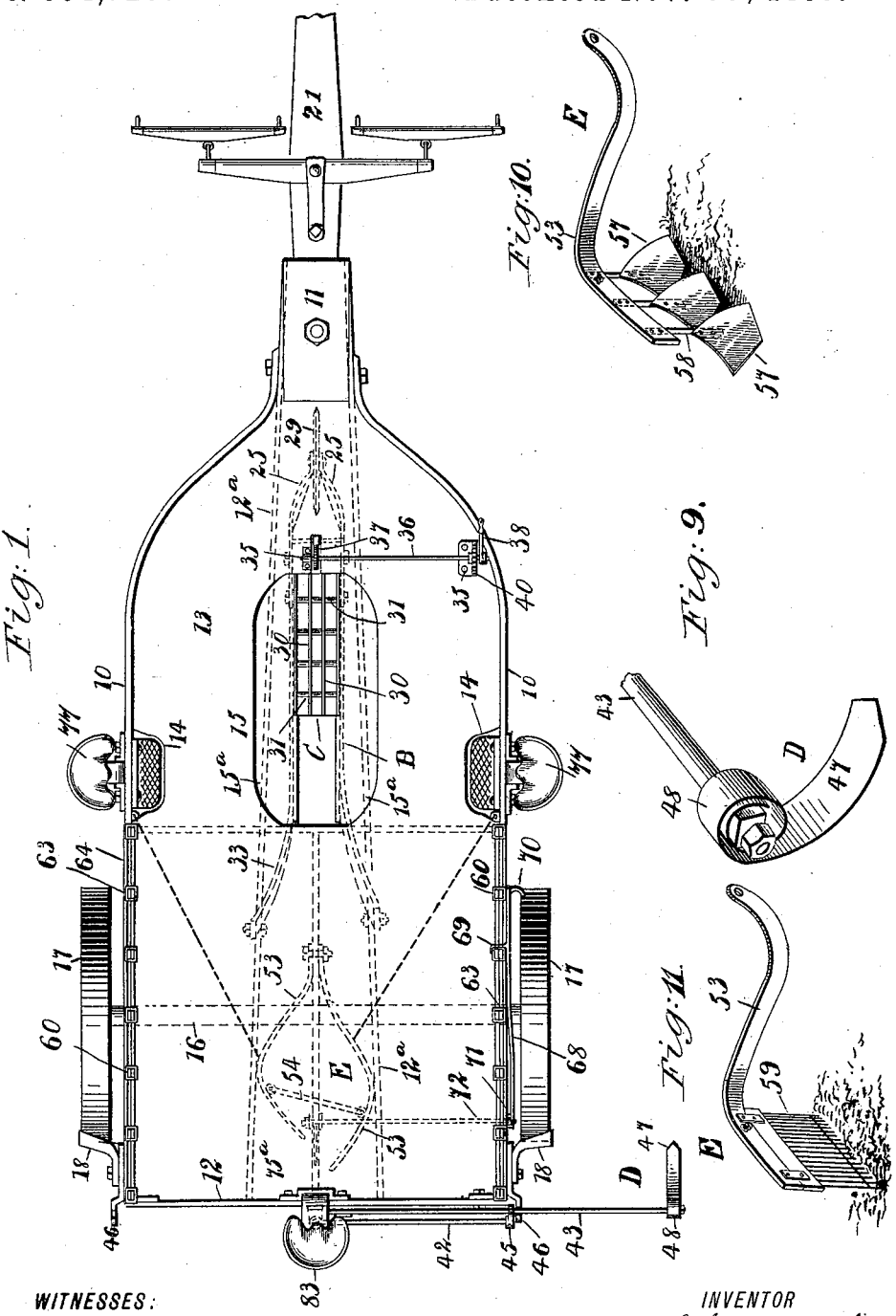
WITNESSES:
J. A. Rennie
Fred. Acker
INVENTOR
J. C. d'Azevedo
BY
ATTORNEYS.

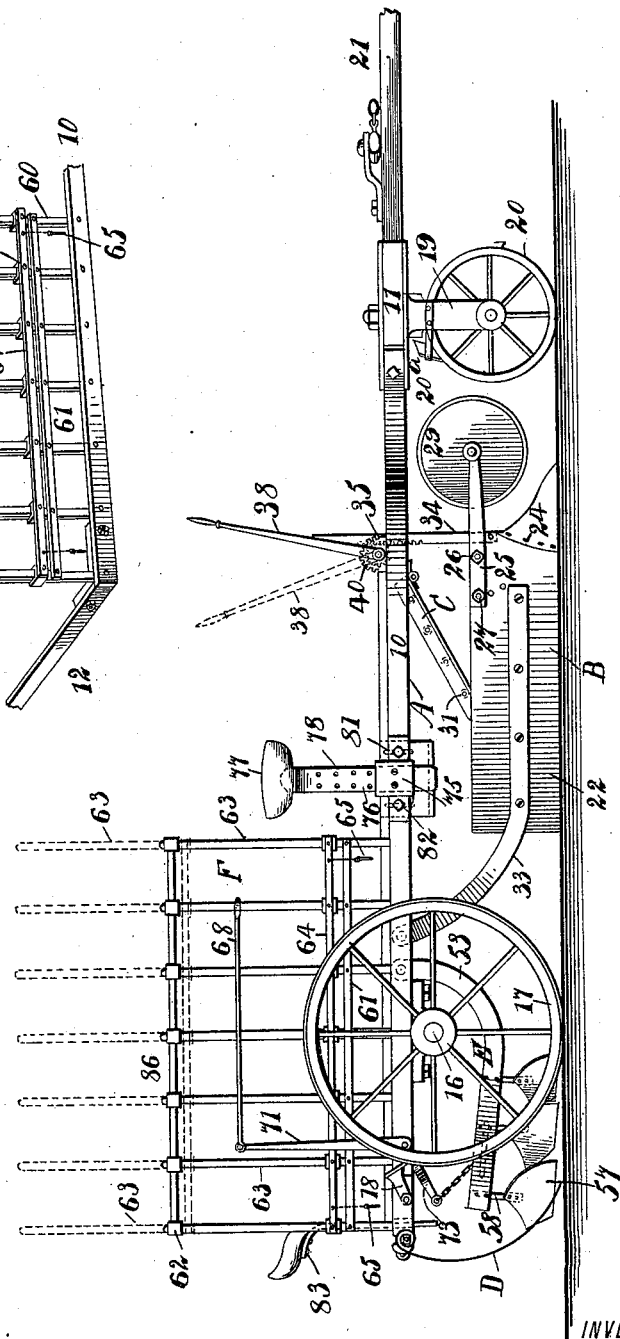

(No Model.) 3 Sheets—Sheet 3.

J. C. D'AZEVEDO.
CANE PLANTER.

No. 594,720. Patented Nov. 30, 1897.

WITNESSES:
INVENTOR
J. C. d'Azevedo.
BY
ATTORNEYS.

THE NORRIS PETERS CO., PHOTO-LITHO., WASHINGTON, D. C.

UNITED STATES PATENT OFFICE.

JACOB C. D'AZEVEDO, OF BROOKLYN, NEW YORK.

CANE-PLANTER.

SPECIFICATION forming part of Letters Patent No. 594,720, dated November 30, 1897.

Application filed March 13, 1896. Serial No. 583,091. (No model.)

*To all whom it may concern:*

Be it known that I, JACOB C. D'AZEVEDO, of Brooklyn, in the county of Kings and State of New York, have invented a new and Improved Cane-Planter, of which the following is a full, clear, and exact description.

My invention relates to an improvement in cane-planters, and especially to that class of machines in which the operation of making a furrow, planting the cane, and covering the furrow will be accomplished in successive and closely-following steps.

The object of the invention is to provide a machine which is especially adapted for planting cane on such plantations as are found in Louisiana and other plantations on the American continent, it being possible to plant cane of any desired length, if necessary full-length cane, and to plant the cane in multiple in the same furrow, the dropping of the various pieces of cane to be placed together in a furrow being simultaneously accomplished.

In many of the plantations the ground is covered with pea-vines or vines of like character, and these vines render the work of planting by machinery an operation of some difficulty. One of the objects of this machine is to provide a means for cutting these vines in advance of the plow, so that they will not interfere with its action.

A further object of the invention is to provide coverers for the open furrows of simple, durable, and economic construction and means for expeditiously and conveniently raising or adjusting both the plow and the furrow-coverers.

Another object of this invention is to provide the machine with a marker especially adapted to this class of machines and which will not be rendered inoperative by contact with an obstruction.

Another object of the invention is to provide for the ready and convenient handling of the cane from a receptacle on the machine to the chute which is to conduct the cane into the furrow, and, furthermore, to provide a means whereby the storage-receptacle for the cane on the machine may be rendered large or small, as occasion may demand.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 7:
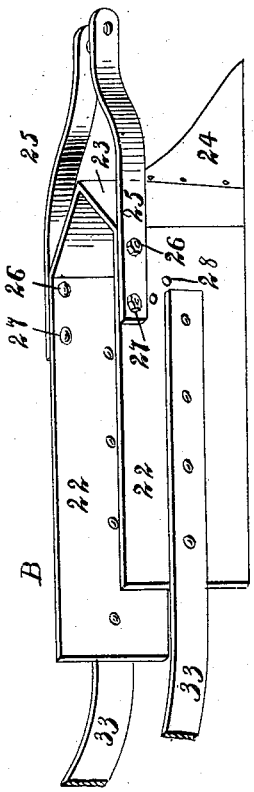
Figure 5:
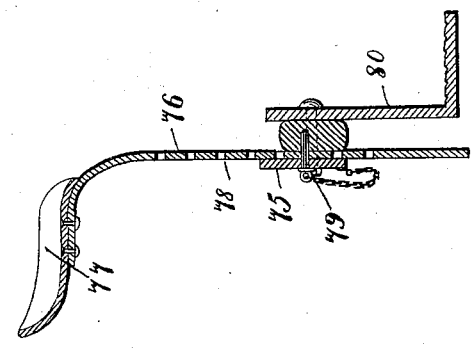
Figure 4:
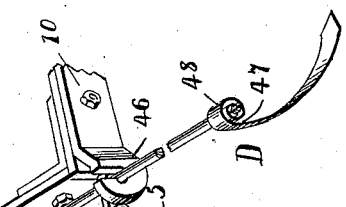
Figure 8:
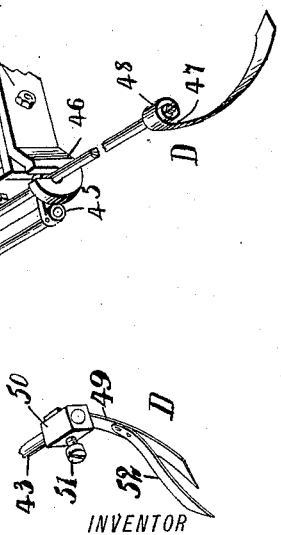

Figure 1 is a plan view of the machine. Fig. 2 is a side elevation of the machine. Fig. 3 is a perspective view of a portion of the frame of the machine and one side of the cane-receptacle. Fig. 4 is a detail perspective view of the rear end of the machine, illustrating the application thereto of the marker. Fig. 5 is a vertical section through a portion of the frame and likewise through a seat and a foot-rest adjustable on the frame. Fig. 6 is a detail perspective view of the lifting device for the plow and the cane-conducting chute. Fig. 7 is a perspective view of the plow. Fig. 8 is a perspective view of one form of marker. Fig. 9 is a similar view of a second form of marker. Fig. 10 is a detail perspective view of the coverer of the planter, and Fig. 11 is a similar view of a modification of the coverer shown in Fig. 2.

In carrying out the invention the frame of the machine may be said to consist of two side bars 10, made to converge at their forward ends, being connected at said ends to a spacing-block 11, and a cross-bar 12, which connects the side bars at the rear, together with a platform 13, which is secured to the bars of the frame, and this platform is likewise preferably supported by longitudinal rods or braces 12$^a$, as shown in dotted lines in Fig. 1. At each side of the platform, preferably near its center, an opening 14 is made quite close to the side bars, and a larger and longer opening 15 is produced longitudinally in the said platform between the side openings 14. The rear portion of the frame is supported upon an axle 16, which is provided with suitable ground-wheels 17, and the periphery of each wheel is engaged by a scraper 18, ordinarily attached to the frame. A fork 19 or its equivalent is pivoted in the forward spacing-block 11, and in the said fork a small single wheel 20 is journaled, adapted to support the front of the machine, and the periphery of this wheel is likewise engaged by a scraper 20ª. The pole 21 is attached to the forward central portion of the machine-frame.

A plow B is located beneath the opening 15 in the platform of the machine, and at each side of the platform a shield 15ª is provided, which shields serve in a measure to direct the cane placed in the opening 15 to the plow. The plow, as shown in detail in Fig. 7, consists of two properly-spaced side plates 22, a front angle-plate 23, and a furrow-opener 24, located at the front central portion or at the pointed portion of the front angle-plate, the furrow-opener 24 being practically inverted-U shape in cross-section; but a plow of any shape may be used. Arms 25 are forwardly projected from the upper side portions of the plow, and these arms are pivoted to the sides 22 by means of bolts 26 or their equivalents, and the forward ends of the arms 25 may be given an upward or downward inclination by passing bolts 27 through their rear ends and through any one of a series of apertures 28 made in the sides of the plow. A colter or cutting-wheel 29 is journaled between the forward ends of the arms 25, as shown best in Fig. 2, and the aforesaid colter or cutting-wheel is over the upper ridge of the furrow-opener and is adapted to cut pea-vines or vines of any character that may have been grown upon the soil which is to be planted with cane.

A cane-conducting chute C is located between the frame and the plow. This cane-conducting chute is pivoted at its upper forward end to the frame in any suitable or approved manner, as shown in Fig. 2, the point of attachment to the frame being at or near the forward end of the opening 15, and the inclined sides 15ª of this opening may serve to guide the cane to the outer compartments of the aforesaid chute. This chute is divided into any desired number of longitudinal compartments by means of longitudinally-placed partitions 30. Ordinarily, however, three compartments are sufficient. The lower end of the chute is open and preferably rests upon the upper edges of the sides of the plow. In order to facilitate the speedy delivery of the cane from the chute into the space of the plow between its side plates, rollers 31 are placed in the bottom portion of each compartment of the chute. The chute is given a downward and a rearward inclination.

Arms 33 are attached to the outer side faces of the plow, and these arms are carried upwardly and rearwardly to a pivotal connection with supports on the frame. Ordinarily the attachment is made to the longitudinal bars 12ª. By reason of this connection of the plow with the frame the plow may be readily raised and lowered, and when the plow is adjusted the cane-conducting chute C will be adjusted in the same direction. The adjustment of the plow is preferably accomplished through the medium of the mechanism shown in Fig. 6, in which a rack-bar 34 is attached to the upper forward end of the plow B and is carried upward through a suitable opening in the platform of the frame in front of the cane-receiving opening 15.

At suitable points on the platform bearings 35 are secured, and in the said bearings a shaft 36 is journaled, having a pinion 37 attached, engaging with the teeth of the aforesaid rack-bar 34. The shaft is rocked or revolved through the medium of a hand-lever 38, attached to one end of the shaft, ordinarily the outer end, and this hand-lever is provided with the usual thumb-latch 39 for engagement with teeth 40, formed upon one of the bearings. At the rear central portion of the frame a horizontal and rearwardly-extending bracket 41 is firmly secured, and a rod 42 is pivoted on this bracket, being capable of swinging from side to side of the frame. A marking-rod 43 is located parallel with the swinging rod 42, as shown in Fig. 4, and the said marking-rod 43 is connected at its inner end and near its forward end with the swinging rod 42 by means of yokes 44 and 45, the yokes being adjustably attached to both of the said rods. At the rear portion of each side of the frame a rearwardly-extending hanger 46 is firmly secured, and in each hanger a recess is made from the top downward, the recesses being adapted to receive the marking-rod 43, and this rod when supported upon a hanger 46 will extend a predetermined distance beyond the side of the machine.

A marker D is removably attached to the outer end of the marking-rod 43. The marker shown in Figs. 4 and 9 consists of a spring-blade having a downwardly and forwardly curved body 47, terminating in a point at its lower end, and a coiled upper end 48, the coiled upper end or head of the marker being adapted to receive the end of the marking-rod and is adjustably secured thereon by nuts or their equivalents. In Fig. 8 I have shown a slight modification of the marker D, in which the body 49 of the marker is curved rearwardly instead of forwardly and is to be drawn over the ground. The upper end of the body 49 of the marker is attached to a block 50, secured upon the marking-rod by means of a set-screw 51 or a like device, and a spring-tongue 52 is secured upon the body of the marker, extending along its upper surface to a point at or beyond its lower end. Under this construction of marker two marking-points are obtained and the line for the next row to be planted will be made very distinct.

Two coverers E are preferably used in connection with the machine. Each coverer comprises an angular shank 53, the shank of one coverer being longer than the other, and the curved faces of the shanks of the two coverers are made to face one another, as shown in dotted lines in Fig. 1, the shanks of both coverers being pivoted to a suitable support beneath the platform of the frame and at the rear of the rear central portion of the plow, which is open. The rear inwardly-curved members of the shanks are arranged to practically overlap, and the said shanks are pivotally connected by means of a rod 54, and at the inwardly-curved rear member of each of the coverer-shanks shovel-like blades 57 are attached, being arranged one in advance of the other and so that their opposing edges will practically overlap, the various shovel-blades 57 being attached to the shank of a coverer by means of standards or rods 58, or, as shown in Fig. 11, the blade portion of each coverer may consist of a series of spring slats or teeth 59, closely arranged and attached to the upper bar, which in turn is secured to the coverer-shank, or the said slats or teeth may be attached directly to the said shanks, forming substantially a rake.

A receptacle F is constructed upon the rear portion of the platform of the machine, adapted to receive a pile of cane that is to be planted. This receptacle is formed by erecting railings 60 at each side of the frame, the said railings being ordinarily attached to a bracing-bar 61, and each of the fixed railings 60 is provided with a strap 62 at its upper end, ordinarily upon its outer face, to loosely receive one end portion of the extension-slats 63, the extension-slats being parallel with and resting upon the fixed slats 60. The extension-slats are all connected to a cross-bar 64, and when the extension-slats are in their lower position (shown in Fig. 3) their connecting-bar 64 will practically rest upon the brace-bar 61 of the fixed slats, and when the extension-slats are carried upward to the position shown in dotted lines in Fig. 2 they may be held in this position by passing pins 65, attached usually to the connecting-bar 64, through openings 66 made in the said bar and into openings 67 made in the fixed slats.

The coverers may be raised and lowered and held in the desired position through the medium of a lever 68, which is provided with an inwardly-extending hook 69, adapted for engagement with the slats at one side of the frame, and a second and outwardly-extending hook 70 is formed usually at the forward end of this lever, serving as a handle. The rear end of the lever is pivotally connected with a crank-arm 71, which is secured to a rock-shaft 72, and the said shaft is provided with a second crank-arm 73, attached by means of a chain 74 to the link or connecting bar 54 of the coverer. It will be observed that the railing of the cane-receptacle serves as a keeper for the adjusting-lever of the coverers.

Adjacent to each opening 14 in the side portion of the platform a strap 75 is secured to the outer face of the side bars of the platform, and the shank 76 of a seat 77 is passed downward between each strap of the frame, and these seats are rendered vertically adjustable by providing their shanks with apertures 78, making an opening in the straps 75 and the frame, and passing a pin 79 through the opening in the strap and through a registering opening in the seat-shank and then into the opening in the frame, as shown in Fig. 5. Preferably each seat-shank has two rows of apertures 78, and two locking-pins 79 are consequently employed.

A foot-rest 80 is adjustably attached to the inner face of each side bar of the frame near each seat 77, and the foot-rests are ordinarily rendered adjustable by making slots 81 therein, as shown in Fig. 2, and passing bolts 82 through these slots and through the frame and the foot portions of the straps 75 should they extend sufficiently far along the frame.

A third adjustable seat 83 is located at the rear central portion of the frame, as shown in Figs. 1 and 2, the shank of said seat being received by a strap 75ª, (shown in Fig. 4,) and this seat may or may not be provided with a foot-rest. The rear seat is to accommodate a boy whose duty it will be to see that the cane in the receptacle is in proper order and also to cut any crooked cane that could not be properly fed into the delivery-chute C, while the cane is taken from the receptacle by attendants located at the side seats 77 and is delivered to the compartments of the aforesaid delivery-chute.

In the operation of the machine the colter will cut the pea-vines or any other vines tending to impede the progress of the plow, and the plow will open a practically U-shaped furrow, into which furrow the cane in full length or in any desired length will be laid in any desired quantity side by side. As the machine advances the coverers will carry the earth into the furrow to close the same and cover the planted cane, while the marker will indicate the position of the next furrow to be made or row to be planted. It is evident that the marker may be readily swung from one side of the machine to the other, as occasion may demand.

Under the old system of planting cane a furrow is first made with a regular plow, leaving the furrow V-shaped. The furrow is then replowed with a "fluke" in order to widen the bottom of the furrow, since in such places as Louisiana it is necessary that the cane should be planted in substantially full length and in triplets or in couples, owing to the poverty of the soil and the poverty of the cane as compared to the cane and the soil in the island of Cuba, where it is only necessary that a few joints of cane should be planted and the cane passed singly in order to secure satisfactory results, since the soil is exceedingly fertile and the cane of the best quality. After the fluke has widened the furrow the cane is planted by hand therein, and afterward the planted cane must be covered. Thus there will be four operations under this old method, which is the one usually employed, before the process of planting is properly completed, involving the employment of a number of hands and the assistance of many machines and mules or horses, whereas when a machine is constructed as above described and is put into use the entire process of planting is completed after the machine has once passed over a given area of ground, and but three or four attendants are necessarily employed. Each and every part of the machine is simple and durable and the knowledge of its proper manipulation is within the scope of any person of ordinary intelligence.

When the marker is in position on either side of the machine, a locking device is employed to maintain it in its set position, and one form of such a retaining device may be a pin 84, which is connected with the back of the frame of the machine by a chain and is carried over the swinging bar and entered into an opening 85, made in the back bar of the frame, as shown in Fig. 4.

Having thus described my invention, I claim as new and desire to secure by Letters Patent—

1. In a machine for planting cane, a conducting-chute for the cane, the said chute being divided into compartments and each compartment being provided with antifriction-rollers in its bottom, and a plow located beneath the said conducting-chute, the said plow comprising a body portion having a chamber open at the back, the said chamber being arranged to receive the cane from the conducting-chute, and a furrow-opener located at the forward end of the said body, as and for the purpose specified.

2. In a cane-planting machine, the combination, with a wheel-supported platform having an opening therein for the reception of cane, and a cane-conducting chute having a hinged support below the platform adjacent to its cane-receiving opening, the body portion of the chute extending beneath the said opening and the said chute being provided with a longitudinal partition, of a plow having a pivotal connection with the machine and extending beneath the cane-conducting chute, the said plow comprising a chambered body, angular at the front and open at the top, bottom and back, and a furrow-opener attached to the angular front portion of the said body, the said cane-conducting chute having its free end resting upon the body of the plow and delivering the cane in the chambered body of the said plow, an adjusting device connected with the free end of the said plow, and a cutting-wheel carried by the forward portion of the plow and supported over the furrow-opener of the same, as and for the purpose specified.

3. In a cane-planting machine, the combination, with a wheel-supported platform having an opening therein for the reception of cane, and a cane-conducting chute having a hinged support beneath the platform adjacent to its cane-receiving opening, the body portion of the chute extending beneath the said opening, and the said chute being provided with a longitudinal partition, of a plow having a pivotal connection with the machine and extending beneath the cane-conducting chute, the said plow comprising a chambered body, angular at the front and open at the top, bottom and back, and a furrow-opener attached to the angular front portion of the body, the said cane-conducting chute having its free end resting upon the body of the plow and delivering the cane into the chambered body of the free end of the said plow, an adjusting device connected with the plow, a cutting-wheel adjustably connected with the body portion of said plow, being supported over the furrow-opener of the same, a rest connected with the plow and adapted to receive the free end of the said cane-conducting chute, and a coverer located at the rear of the plow, the said furrow-coverer being made in two sections, one section being of sufficient length to overlap the other section, as and for the purpose set forth.

4. In a machine for planting cane, the combination with the frame provided with a platform having openings therein at opposite sides, of a seat adjustably secured to the frame at each opening, and a foot-rest secured to the frame at each opening and extending below said opening, substantially as described.

JACOB C. D'AZEVEDO.

Witnesses:
J. FRED. ACKER,
JNO. M. RITTER.